US010477778B2

(12) United States Patent
Vezina et al.

(10) Patent No.: US 10,477,778 B2
(45) Date of Patent: Nov. 19, 2019

(54) PLANT INFILTRATION TRAY

(71) Applicant: MEDICAGO INC., Québec (CA)

(72) Inventors: Louis-Philippe Vezina, Neuville (CA); Nicole Bechtold, Quebec (CA); Luc Laurin, Brossard (CA)

(73) Assignee: MEDICAGO INC., Quebec, Quebec (CA)

( * ) Notice: Subject to any disclaimer, the term of this patent is extended or adjusted under 35 U.S.C. 154(b) by 638 days.

(21) Appl. No.: 14/404,557

(22) PCT Filed: May 28, 2013

(86) PCT No.: PCT/CA2013/050406

§ 371 (c)(1),
(2) Date: Nov. 28, 2014

(87) PCT Pub. No.: WO2013/177701

PCT Pub. Date: Dec. 5, 2013

(65) Prior Publication Data

US 2015/0181812 A1 Jul. 2, 2015

Related U.S. Application Data

(60) Provisional application No. 61/652,284, filed on May 28, 2012.

(51) Int. Cl.
*A01G 9/02* (2018.01)

(52) U.S. Cl.
CPC .................................... *A01G 9/02* (2013.01)

(58) Field of Classification Search
CPC . A01G 9/08; A01G 9/088; A01G 9/10; A01G 9/1026; A01G 9/1066; A01G 7/02;
(Continued)

(56) References Cited

U.S. PATENT DOCUMENTS 929,464 A * 7/1909 McGinnis ................. A23L 3/10 211/74
2,979,210 A * 4/1961 Patterson .................. B01L 9/06 211/74

(Continued)

FOREIGN PATENT DOCUMENTS

EP 1004235 A2 5/2000
GB 2404130 A 1/2005
JP 5-328856 A 12/1993

OTHER PUBLICATIONS

International Search Report and Written Opinion of International application No. PCT/CA2013/050406.

*Primary Examiner* — Thanh Pham
(74) *Attorney, Agent, or Firm* — Norton Rose Fulbright Canada LLP

(57) ABSTRACT

A plant tray for receiving and retaining one or more plant pots includes a plant-receiving tray for use in a high-throughput plant infiltration process used to produce recombinant proteins. The plant tray described has a base retaining tray with an upper surface defining cavities for receiving the plant pots, and a top plate displaceably mounted on the base retaining tray and having apertures, the apertures defining a channel with the corresponding cavities of the bottom tray when aligned. The top plate is displaceable between a locked operative position wherein the apertures and the corresponding cavities are partially misaligned, thereby locking the plant pots in between the top plate and the base retaining tray.

11 Claims, 7 Drawing Sheets

(58) Field of Classification Search
CPC .......... A01G 7/06; A01G 9/028; A01G 9/045; A01G 1/042; A01G 1/047; A01G 31/02; A01G 9/025; A01G 31/04; A01G 31/045; A01G 31/06; A01G 9/0297
USPC ....... 222/153.01, 191, 485, 129, 142, 142.7, 222/142.8
See application file for complete search history.

(56) References Cited

U.S. PATENT DOCUMENTS

| | | | | | |
|---|---|---|---|---|---|
| 3,987,824 | A * | 10/1976 | Zehnder | F25C 5/00 | 141/104 |
| 4,398,578 | A * | 8/1983 | Walters | A01C 7/16 | 111/901 |
| 5,259,519 | A * | 11/1993 | Lieberman | A47F 5/0853 | 211/66 |
| 5,513,888 | A * | 5/1996 | Kirkland | B65D 71/50 | 294/159 |
| 6,023,916 | A * | 2/2000 | Bouthiette | A61J 7/0069 | 206/534 |
| 7,536,829 | B2 | 5/2009 | Genma et al. | | |
| 8,320,062 | B1 * | 11/2012 | Persson | G02B 7/021 | 359/811 |
| 2004/0118729 | A1 * | 6/2004 | Craig | B65B 25/026 | 206/423 |
| 2006/0288640 | A1 | 12/2006 | Leithold | | |
| 2010/0199554 | A1 * | 8/2010 | Smaal | A01G 9/086 | 47/66.7 |
| 2011/0056131 | A1 | 3/2011 | Smith et al. | | |

* cited by examiner

PLANT INFILTRATION TRAY

CROSS-REFERENCE TO RELATED APPLICATIONS

The present international application claims priority on U.S. Patent Application No. 61/652,284 filed May 28, 2012, the entire content of which is incorporated herein by reference.

TECHNICAL FIELD

The present invention relates generally to a plant tray for receiving and retaining a plurality of plant pots, and more particularly to a plant-receiving tray for use in a high-throughput plant infiltration process used to produce recombinant proteins.

BACKGROUND

There is a resurgence of interest in the production of new therapeutic agents using botanical sources. Genetically engineered plants can now be used to produce pharmacologically active proteins, including mammalian antibodies, blood product substitutes, vaccines, hormones, cytokines, and a variety of other therapeutic agents. Plant production of biopharmaceuticals holds great potential, and may become an important production system for a variety of new biopharmaceutical products such as vaccines and recombinant proteins for example.

Plants are potentially a low cost and contamination safe factory for the production of recombinant biopharmaceutical proteins. Plants are uniquely capable of efficient protein expression of different complexity levels at high yields and low costs. Plant-based biopharmaceuticals manufacturing systems represent a viable alternative to the traditional biopharmaceuticals development processes, and may provide tremendous advantages over current traditional production systems.

However, certain challenges nonetheless remain with the use of plants for the commercial production of proteins, most particularly because previously used systems for the infiltration and processing of plants remain relatively laborious and cost ineffective. For example, plant trays, which have been long widely used in plant nurseries and greenhouses, are not adapted for automatic transplanters and high-throughput automated processes, such as those which may be used in automated infiltration systems.

Accordingly, improvements in making plant-based proteins automated production more commercially viable still remain, in terms for example of the efficiency and cost effectiveness of production, the quality control and standardization of the produced proteins.

Therefore, there is a need for an improved tray for receiving plant samples adapted to be used when performing the infiltration of such plants in an automated process, such as a high-throughput process of candidate proteins and a standardized process for the production of recombinant proteins for example.

SUMMARY

There is provided a plant tray assembly for holding plants and associated media comprising: a base retaining tray having an upper surface defining a plurality of cavities therein for receiving plant pots therein, the plant pots containing the plants and associated media; and a top plate mounted on said base retaining tray and being displaceable relative thereto in a plane substantially parallel to said upper surface, the top plate having a plurality of apertures defined therein and which extend transversely therethrough in a direction substantially normal to said plane, the apertures of the top plate corresponding to the cavities in the base retaining tray in number and configuration, the top plate and the base retaining tray being relatively displaceable between a loading/unloading position and an locked operative position of the plant tray assembly, wherein the apertures of the top plate and the cavities of the base retaining tray are substantially aligned in said loading/unloading position such as to define transversely open plant receiving channels, the plant receiving channels permitting the plant pots to be passed therethrough and received within the cavities of the base retaining tray such that the plants protrude through the apertures of the top plate, and wherein said apertures of the top plate and the cavities of the base retaining tray are at least partially misaligned in said locked operative position such that the plant pots are trapped within the plant tray assembly while the plants remain protruding through the apertures of the top plate.

The plant tray assembly described herein may, further comprises an actuating device for displacing the top plate relative to the base retaining tray. In one possible embodiment, the actuating device comprises a first arm having a remote outer end thereof engageable to the top plate and an opposed inner end thereof pivotably mounted to an upstanding supporting bar having a rigid non-pivoting arm extending from a bottom end thereof, the non-pivoting arm having a remote outer end which is engageable to the base retaining tray, wherein the supporting bar is pivotable about the remote outer end of the non-pivoting arm such as to be inclined relative to the plant tray assembly, the first arm being thereby horizontally displaced in a plane parallel to the top plate such as to translate the top plate between the loading/unloading position and the locked operative position.

There is also provided a method for retaining at least one plant pot in a plant tray assembly, said plant tray assembly including a base retaining tray having at least one cavity therein for receiving the plant pot and a top plate displaceably mounted on said base retaining tray and having at least one aperture therein, the method comprising: positioning the top plate relative to the base retaining tray in a loading/unloading position wherein the apertures in the top plate and the cavities of the base retaining tray are substantially aligned to form an open-topped channel; inserting the plant pot through said open-topped channel; and displacing the top plate relative to the base retaining tray into a locked operative position, wherein the aperture of the top plate and the cavity of the base retaining tray are partially misaligned, thereby trapping the plant pot in between the top plate and the base retaining tray to lock the plant pot in position within the cavity.

The method provided may also include a method of manipulating the plant tray assembly having at least one plant pot containing a plant retained therein, the method comprising: locking the plant pot in the plant tray assembly in accordance with the above method, such that the top plate and base retaining tray are in said locked operative position; and the inverting the plant tray assembly by rotating the plant tray assembly by 180 degrees, the plant pot being retained in position within the cavity of the base retaining tray.

BRIEF DESCRIPTION OF THE DRAWINGS

Reference will now be made to the accompanying drawings.

It will be noted that throughout the appended drawings, like features are identified by like reference numerals.

DETAILED DESCRIPTION

As noted above, plants are potentially a low cost and contamination safe factory for the production of recombinant biopharmaceutical proteins. Accordingly, the system described herein is intended to be used in conjunction with a larger automated machine and/or process for the production of biopharmaceutical proteins, including recombinant proteins, such as antibodies, blood product substitutes, vaccines, hormones, cytokines, and a variety of other therapeutic agents, such as biosimilars.

Accordingly, the plant tray 10 of the present disclosure has been developed in order to be used in conjunction with an automated and high-volume processing device, such as the one described in International application no. PCT/CA2013/050118 filed Feb. 15, 2013, which is incorporated herewith by reference, so as to allow for the simultaneous infiltration of a high number of plants with a given inoculum, such as with agrobacterium inoculums for example. The presently described plant tray 10 can be mounted on a processing device which enables the rapid processing of a high number of individual plants, thereby permitting the production of biopharmaceuticals to be greatly accelerated in comparison with more tradition technologies.

Figure 1:
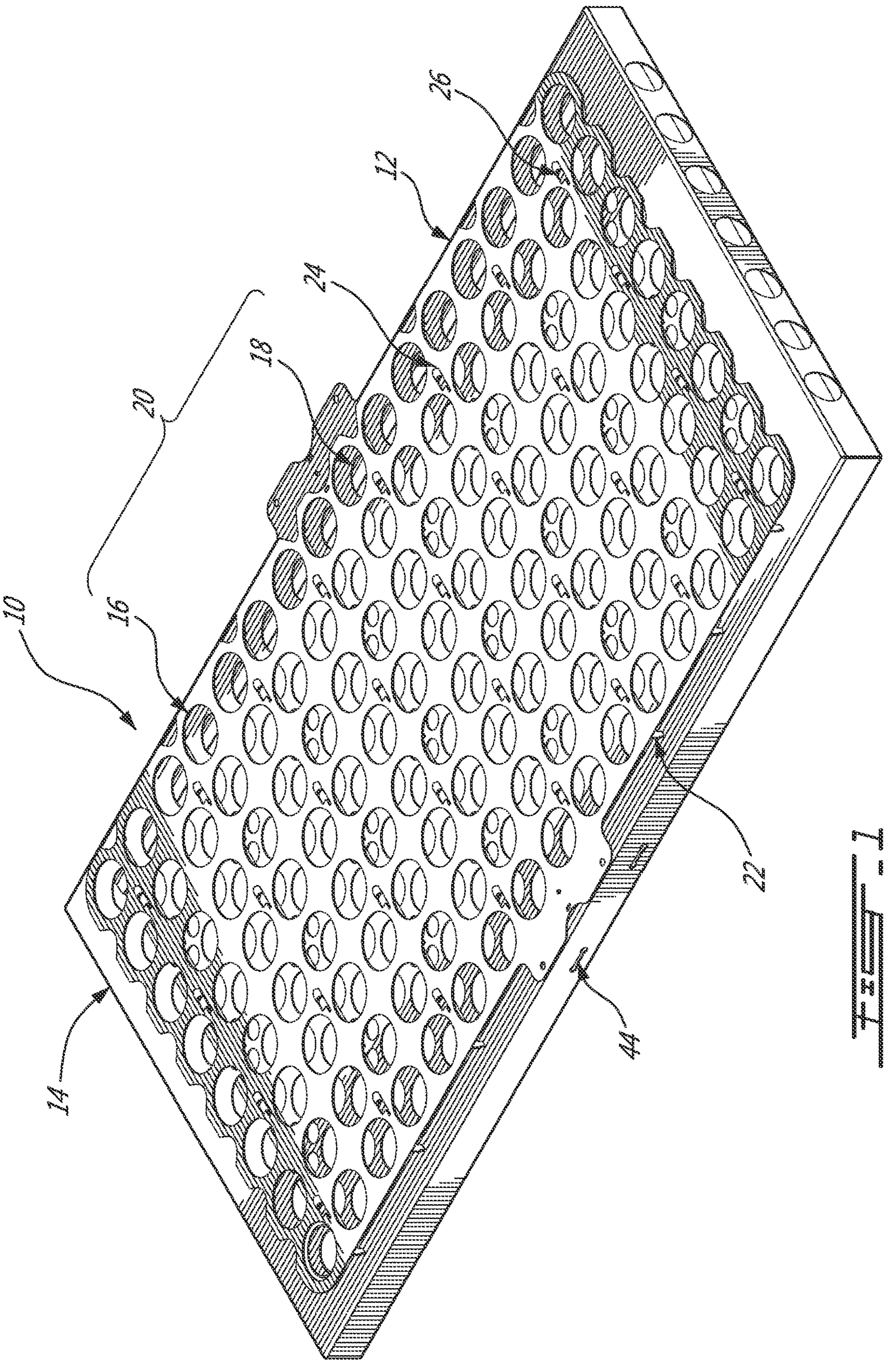
FIG. 1 is a top perspective view of a plant tray in accordance with one embodiment of the present disclosure, the plant tray being adapted to receive plants therein for infiltrating the plants with an inoculum for vaccine production, the plant tray comprising a base retaining tray and a top plate displaceably mounted thereto.
Figure 2:
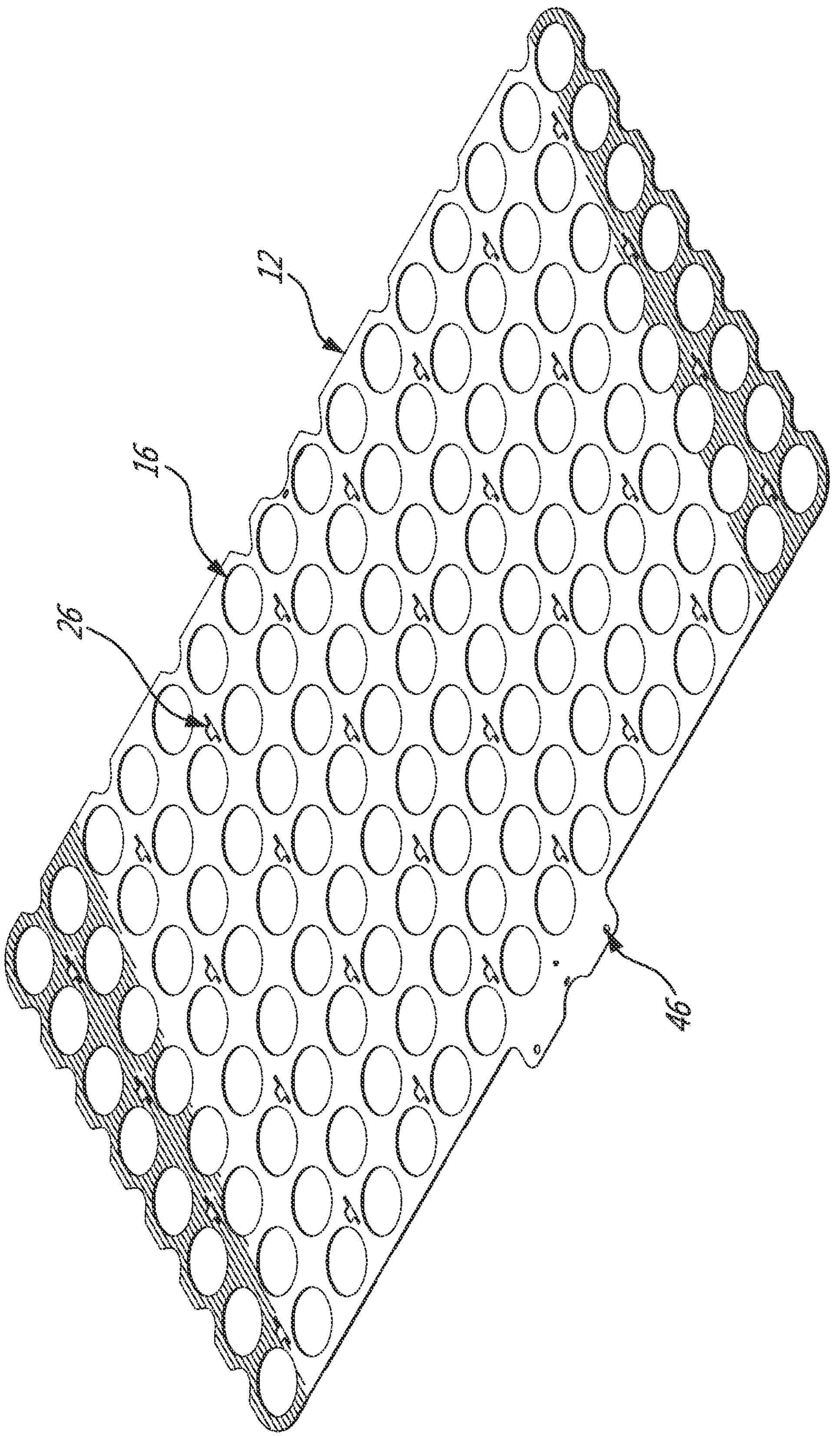
FIG. 2 is a front perspective view of the top plate of the plant tray of FIG. 1.
Figure 3:
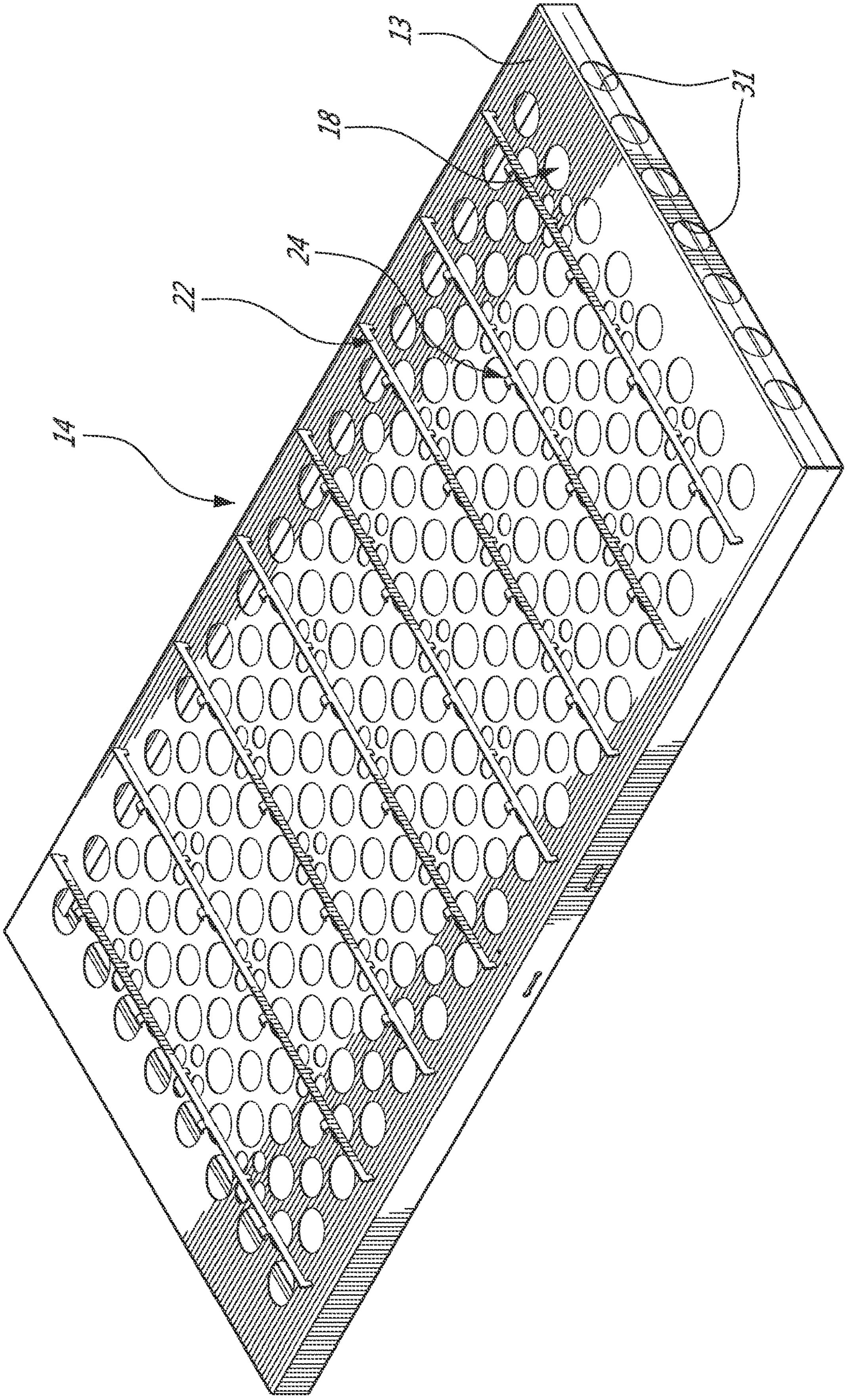
FIG. 3 is a top perspective view of the base retaining tray of the plant tray of FIG. 1.
Figure 5:
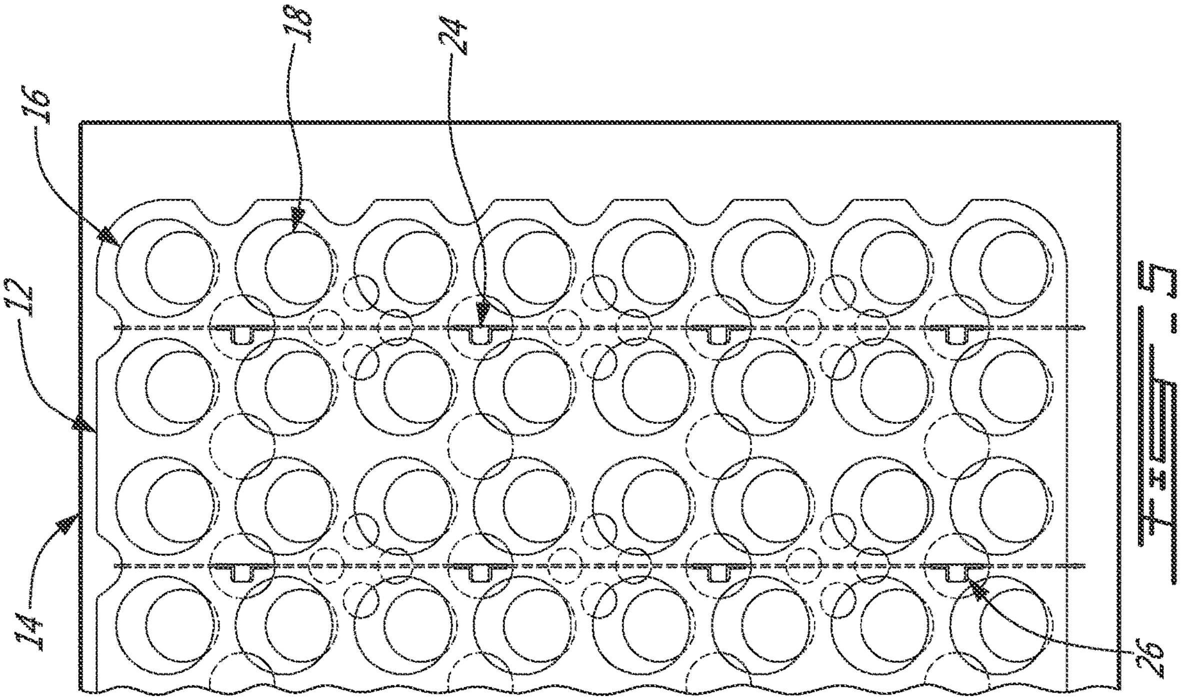
FIG. 5 is a partial top view of the plant tray of FIG. 1 shown in an operative position, wherein the apertures of the top plate and the cavities of the bottom retaining tray are misaligned.
Figure 4:
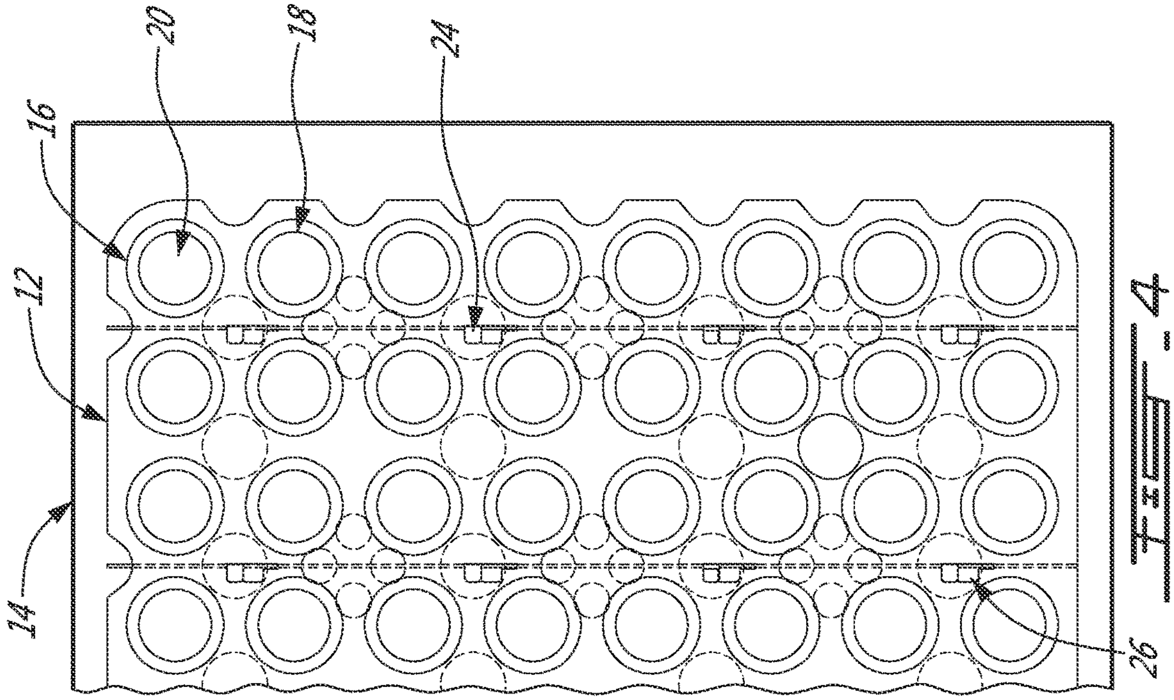
FIG. 4 is a partial top view of the plant tray of FIG. 1 shown in a loading/unloading position, wherein apertures in the top plate are aligned with cavities in the base retaining tray.

Referring now to FIGS. 1-3, the plant tray 10 of the present disclosure may be used to receive and retain a plurality of potted plants for manipulation thereof for a variety of possible applications, however the plant tray 10 is particularly adapted to be used in conjunction with a high-throughput automated machine and process used to infiltrate the plants with an inoculum for producing recombinant proteins or various biopharmaceuticals. The plant tray 10 generally includes a base or bottom retaining tray 14 (or simply base tray or bottom tray 14) and atop plate 12 which is detachably mounted to the base tray 14 such as to be displaceable relative thereto between at least two positions, as will be seen in further detail below. The top plate 12 is thus connected to the bottom tray 14 in a manner which permits it to move relative thereto between at least a loading/unloading position (as shown in FIG. 4), wherein the plant pots containing the plants can be introduced into the plant tray 10, and an operative position (as shown in FIG. 5), wherein the plant pots are locked in place within the plant tray 10 during manipulation of the tray and/or fluid processing of the plants therein. This displacement of the top tray may, in at least one possible embodiment, comprise lateral movement in a plane, for example a sliding, rotating or pivoting movement.

As best seen in FIG. 3, the base retaining tray 14 comprises an upper surface 13 defining therein a plurality of cavities 18 which are sized and shaped such as to snugly receive pots having the plants therein. The cavities 18 may, but need not, be closed-bottomed, provided that they can receive and support a plant pot therein. For example, the diameter selected for the cavities 18 in the base retaining tray 14 should be such that they are big enough to receive a lower portion of a plant put to be used, but smaller than the upper rim or rim edge of the pot, for example, such that the pot will fit within the cavity 18 but not fall through the cavity 18 when the base retaining tray 14 is lifted or otherwise displaced. The cavities 18 are disposed in rows, with one or more cavities 18 per row, into which a plant pot can be inserted. Each of the cavities 18 is minimally distanced from the next adjacent cavity or cavities in order to allow a plant pot to be inserted without interference between neighboring plant pots or plant leaves in adjacent cavities 18. As depicted in FIGS. 1-3, the bottom tray 14 has a rectangular shape but can be of any shape and of any height, which may vary depending on the size and the number of plant pots to be received therein.

As seen in FIG. 3, the base retaining tray 14 may include a number of alignment apertures 31 provided in one or more side edges thereof. These alignment apertures are configured to matingly receive therein one or more alignment pins, disposed for example on a manipulation mechanism adapted to grasp, displace and/or manipulate the plant tray 10. The alignment apertures 31 are accordingly formed such as to engage their counterpart mating alignment pins in a relatively snug fit engagement. Two or more alignment pins may accordingly be used, and can be inserted into a number of different ones of the alignment apertures 31 of the base retaining tray 14, if necessary. The engagement point between the base tray 14 of the present device and any suitable manipulation mechanism can therefore be varied as may be required. The alignment apertures 31 in the depicted embodiment have a substantially circular opening, such as to receive therein pins which, for example, have an at least partially spherical shape. The alignment apertures 31 accordingly permit an accurate and repeatable positioning of the plant tray 10 during its manipulation, and an accurate and repeatable displacement of the top plate 12 relative to the base retaining tray 14, given that the exact position of the base retaining tray 14 is known or can be determined by the actuating device or manipulation system of the tray due to the alignment apertures 31.

The complementary top plate 12 comprises, in at least one embodiment, a plurality of apertures 16 disposed in rows with one or more apertures 16 per row. The top plate 12 is mounted on the bottom tray 14 in a manner which permits relative displacement therebetween, such that the top plane 12 is displaceable between the loading/unloading position as shown in FIG. 4, wherein the apertures 16 of the top plate 12 and the cavities 18 of the base retaining tray are aligned, and the operative position as shown in FIG. 5, wherein the apertures 16 of the top plate 12 and the cavities 18 of the base retaining tray are at least partially misaligned. At least the size and number of apertures 16 in the top plate 12 is complementary to that of the cavities 18 of the bottom tray 14, such that when the top plate 12 and the bottom tray 14 are in the loading/unloading position (FIG. 4), the apertures 16 and the corresponding cavities 18 are aligned such as to create plant receiving channels 20 (see FIG. 4). A plant pot can then be inserted in each of these cannels 20, formed by the coaxially aligned cavities 18 of the retaining tray 14 and the superposed apertures 16 in the top plate 12. In the aligned position, the plant pots, including the media and the plant itself extending out of the plants channels 20, can easily be inserted into the channels 20. Once in position, the plant pots are locked in place within the plant tray 10, as will be described in further detail below, in order to permit the plant tray 10 to be manipulated and used for processing the plants, for example in order to permit the infiltration of an inoculum into the soil, roots and/or leaves of the plant, or removal of the pots including the plants after completion of an automated process. As depicted in FIGS. 1-3, the top plate 12 has a rectangular shape but can be of any shape and of any configuration depending on the size and the number of plant pots to be received, but preferably has a shape and size which is complementary to the shape and/or size of the bottom tray 14.

Figure 8:
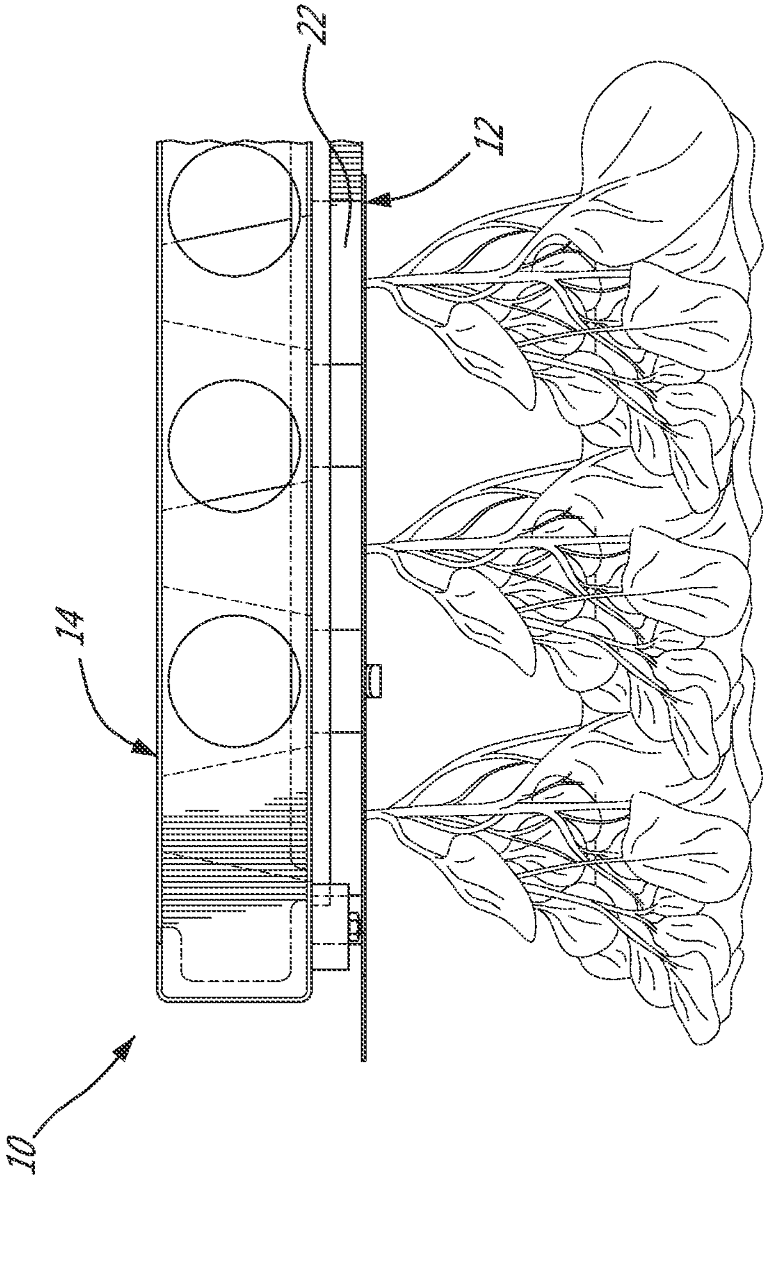
FIG. 8 is a side view of the plant tray of FIG. 1, shown with potted plants inserted therein in the locked position and inverted, the plants facing down.

As noted above, the top plate 12 can be displaced (for example by lateral movement in a plane, either by sliding, pivoting, rotating or otherwise) relative to the retaining tray 14 into an operative or locked position, wherein the apertures 16 in the top plate 12 are no longer aligned with the corresponding cavities 18 in the base retaining tray 14. In the operative or locked position (FIG. 5), the apertures 16 of the top plate 12 and corresponding cavities 18 of the bottom tray 14 are sufficiently misaligned so as to retain the plant pots in position within the plant tray 10, while still permitting the plants and particularly the stems and leafs thereof to protrude through the apertures 16 in the top plate 12 (see FIG. 8). This retention of the pots, when the top plate 12 is in the locked operative position, can be achieved in a number of ways. The pots can be retained, for example, by the top plate 12 sliding sufficiently over the top of the pot so as to leave only the plant stem and leaves emerging from the tray and such that, when inverted, the top of the pot rests on the inwardly facing surface of the top tray 12 thereby preventing the pot from falling out or otherwise becoming displaced from the plant tray 10. Other means for retaining the pots in place within the plant tray 10 are also possible, as described further below. Therefore, even in this misaligned or locked position, at least a portion of the apertures 16 overlap the underlying openings defined by the cavities 18 in the base retraining tray 14, as seen in FIG. 5. The plant pots are accordingly locked in position between the top plate 12 and the retaining tray 14, while the greenery of the plant remains protrudes through the apertures 16 and is thus exposed for processing as may be required.

In an alternate embodiment, the pots are retaining in place within the plant tray 10, when in the locked operative position thereof, using plant pot that is specifically configured to receive at least a portion of the top tray 12 therein, in order to retain the pot in place. In this embodiment, the top plate 12 can be received within a correspondingly shaped slot or opening formed in a top portion of the pot, such that then the edge or lip of the top plate 12 is received in such a slot of the plant pot, the pot is retained in position and prevented from moving even when the entire plant tray 10 is inverted.

In this locked or operative position, when the plant tray 10 is inverted, the plant pots are fixed in place within the plant tray 10 and cannot slide out or otherwise become displaced from the confines of the plant tray 10. This locked or operative position is useful for example when rinsing the plants after injection of inoculums in the plants, and enables the entire plant tray 10 to be inverted without any of the plant pots falling out or moving within the tray.

A number of possibilities exist to enable the relative displacement between the top plate 12 and the base retaining tray 14, preferably but not necessarily in a manner such that they remain substantially parallel relative thereto throughout their displacement. In the depicted embodiment, best seen in FIG. 3 for example, the bottom tray 14 comprises a plurality of upstanding support rails 22 which extend above (i.e. they run parallel to but are spaced apart from) the upper surface 13 of the base retaining tray 14, an upon which the top plate 12 rests and is displaceable. In the depicted embodiment, these support rails 22 create a physical separation, defining a gap therebetween, when the top plate 12 is placed on these rails 22 of the bottom tray 14. The support rails 22 are configured such that the inner surface of the top plate 12 is displaceable on these rails, thereby enabling the sliding displacement of the top plate 12 along the rails, when going between the loading/unloading position (see FIG. 4) and the operative or locked position (see FIG. 5).

In the depicted embodiment, the top plate 12 is removably engaged to the rails 22 on the base tray 14, such as to retain the top plate 12 engaged to the base tray 14 regardless of orientation of the combined plant tray 10, while nevertheless permitting the top plate 12 to be removed when desired from the base tray 14, such as to permit cleaning for example. This removable attachment between the top plate 12 and the base tray 14 is however such as to permit the relative translation between the top plate 12 and the base tray 14, as described above.

Accordingly, as seen in FIGS. 1 to 5, the rails 22 on the base tray 14 include retaining members, or tabs, 24 which may be integrally formed therewith and which extend upward from the support rails 22 and fit within mating slots 26 formed in the top plate 12. These slots 26 may be defined between rows of apertures 16 in the top plate 12, and are elongated in shape such as to permit one of the protruding tabs 24 of the rails 22 to fit within each slot and slide longitudinally therewithin. Accordingly, the length of the slots 26 will restrict and thus control the amount of displacement of the top plate 12 relative to the underlying base tray 14. The retaining members or tabs 24, in at least one possible embodiment, define a hook or L-shaped configuration, with a vertical or upstanding portion thereof being received through the slot 26 in the top plats 12 and the remote end being substantially perpendicular to the vertical or upstanding portion thereof (and therefore also being substantially parallel to the surface of the top plate 12). The shape of the tabs 24 therefore helps to secure the top plate 12 in position on the rails 22 of the base tray 14, without preventing the desired transverse displacement of the top plate 12 relative to the base tray 14 and yet limiting the amplitude of travel in this regard.

The top plate 12 may be actuated for displacement relative to the base tray 14, between the loading/unloading position (FIG. 4) and the operative or locked position (FIG. 5), by a drive mechanism which is either external to the plant tray 10 or which is integrated therein. This actuation may be accomplished, for example, using a drive mechanism which is comprised of an externally operated actuator, for example the actuating device 30 as will be described in further detail below. Alternately, the actuation of the top plate 12 may be achieved using a built-in drive mechanism and/or actuator, for example using an electric motor and actuator integrated into the plant tray 10 to drive the relative displacement between the top plate 12 and the base tray 14 thereof.

Figure 6:
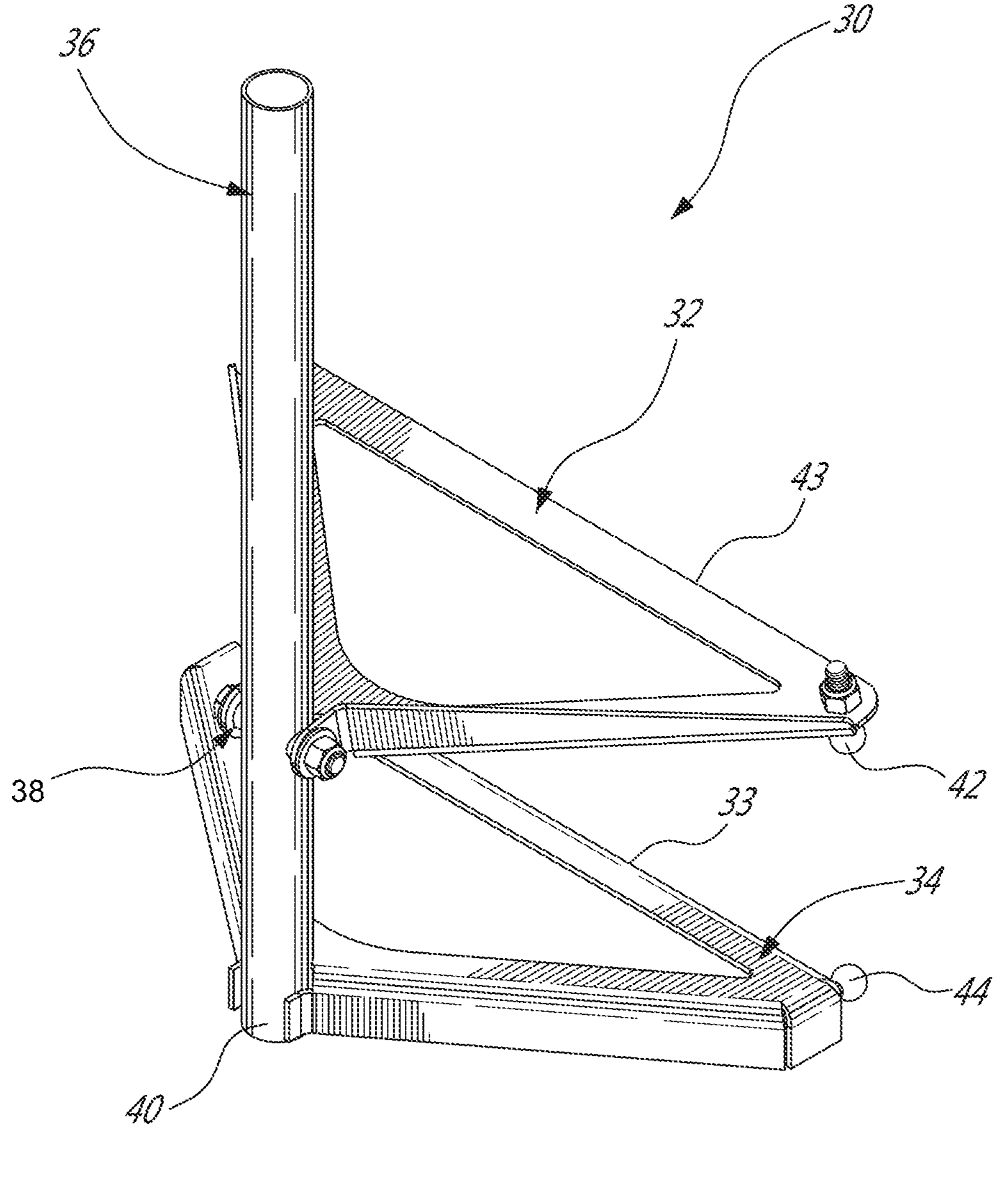
FIG. 6 is a perspective view of an actuating device in accordance with one embodiment of the present disclosure.
Figure 7B:
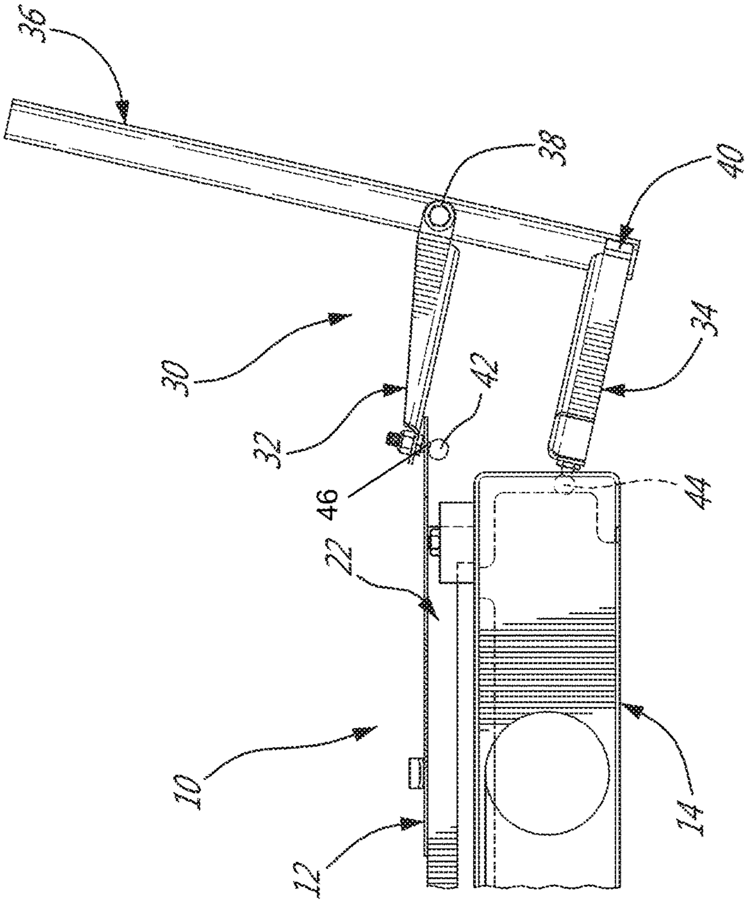
FIG. 7*b* is a side view of the actuating device of FIG. 6 and the plant tray of FIG. 1, shown in the operative position of FIG. 5.
Figure 7A:
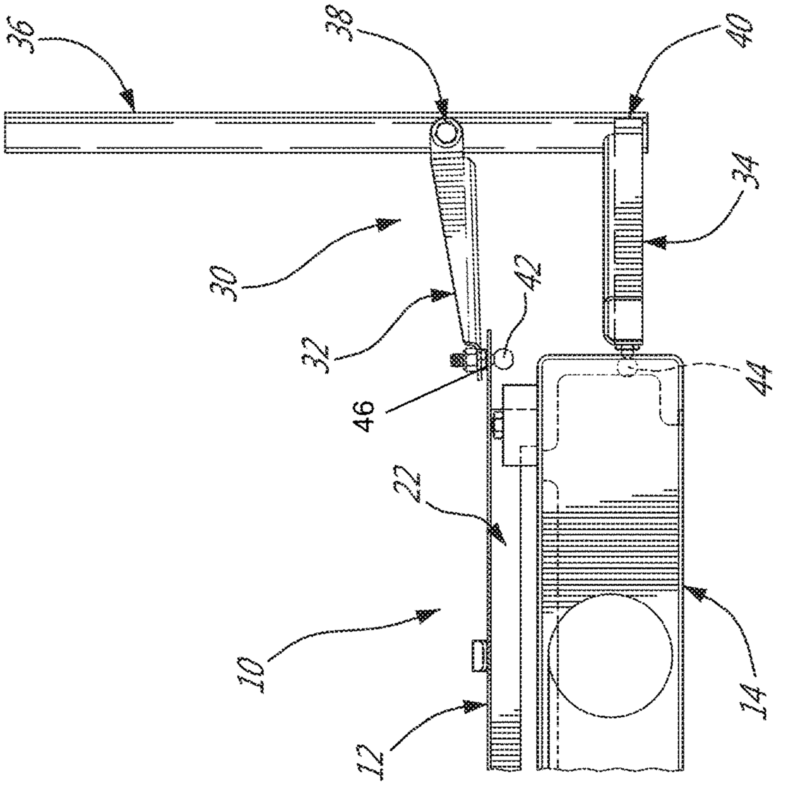
FIG. 7*a* is a side view of the actuating device of FIG. 6 and the plant tray of FIG. 1, shown in the loading/unloading position of FIG. 4.

In a particular embodiment, as shown in FIGS. 6 and 7, an externally mounted actuating device 30 is used to displace the top plate 12 relative to the base tray 14 of the plant tray assembly 10. The actuating device 30 is removably engageable to both the base tray 14 and the top plate 12, such as to slidingly displace one relative to the other between the loading/unloading position and the operative or locked position thereof. More particularly, the actuating device comprises a first arm 32 which connects to the top plate 12 via at least two ball elements 42 mounted along a remote edge 43 thereof which are configured to fit within apertures 46 in the top plate such as to push and/or pull the plate forward and backwards when they are received therein. The opposite end of the first arm 32 is pivotally mounted to a supporting bar 36 by a pivot joint 38 located at least part way up the supporting bar away from a lower end 40 thereof. The upright supporting bar 36 may therefore be used to displace the first arm 32 and thus actuate the top plate 12 between the loading/unloading and locked operative positions, as changing the inclination angle of the upright supporting bar 36 will cause the first arm 32 to be translated substantially horizontally or at least substantially parallel to a plane defined by the top plate 12, as seen in FIGS. 7A and 7B. A non-pivoting arm 34 is rigidly fixed to the bottom end 40 of the upstanding supporting bar 36, and protrudes substantially perpendicularly therefrom. At the remote end 33 of the lower non-pivoting arm 34 is disposed base tray engaging elements 44, which may also be ball elements that fit within correspondingly shaped openings in the base tray 14.

Accordingly, when the base tray engaging elements 44 and the top plate engaging ball elements 42 are disposed in mating engagement with their respective components of the plant tray 10, and with the supporting bar 36 of the actuation device 30 being substantially perpendicular to the plant tray 10, as shown in FIG. 7A, the first arm 32 and non-pivoting arm 34 remain substantially parallel to each other to the plane of the plant tray 10. In order to slide the top plate 12 from the loading/unloading position into the locked operative position as described above, the supporting bar 36 is inclined away from the plant tray 10, pivoting about the base tray engaging elements 44, as shown in FIG. 7B. Accordingly, the first arm 32, which pivots relative to the inclining supporting bar 36, is allowed to remain parallel to the top plate 12 and thereby slides pulls the top plate 12 with it as it is displaced outwardly along its own axis by the inclining supporting bar 36 (as seen FIG. 7B).

The plant tray 10 and associated actuation device 30 disclosed herein therefore allows for the mechanical actuation of the displacement of a top plate 12 of the plant tray 10 between a loading/unloading position, as shown in FIG. 4, and an locked operative position, as shown in FIG. 5. As described above, when the plant tray 10 is disposed in this locked operative position, the plant pots received within the base tray 14 of the plant tray 10 are locked in place therein such that the plant tray 10 can be manipulated, and inversed if necessary, without the plant pots or the plants therewithin from becoming dislodged from the plant tray 10. This permits the plant tray 10 to be used in an automated, fully automatic and machine driven plant-processing procedure, such as the plant infiltration process and machine described in International application No. PCT/CA2013/050118 filed Feb. 15, 2013. The plant tray 10 can therefore be employed in an automated process in accordance with a programmable operation to be performed, and can be used in a process to precisely control each infiltration performed on the plants. All of this permits the rapid and efficient infiltration of numerous plants with an inoculum, thereby inserting nucleic acids encoding for a biopharmaceutical, such as, for example, a recombinant protein or a recombinant antibody, thereby enabling a high-throughput infiltration system for large scale production of plant-based biopharmaceuticals.

The above embodiments described herein are meant to be exemplary only, and one skilled in the art may make changes thereto without departing from the spirit and scope of the appended claims. All such changes including those discussed above, are intended to fall within the scope of the appended claims.

The invention claimed is:

1. A plant tray assembly for holding at least one plant pot containing at least one plant and associated media, the plant tray assembly comprising:

a base retaining tray having an upper surface defining a plurality of cavities for receiving the at least one plant pot therein; and a top plate mounted on said base retaining tray such that an inwardly-facing surface of the top plate faces the upper surface of the base retaining tray, the top plate being displaceable relative to the base retaining tray in a plane substantially parallel to said upper surface, the top plate having a plurality of apertures defined therein and which extend transversely therethrough;

the top plate and the base retaining tray being relatively displaceable between a loading and unloading position and a locked operative position of the plant tray assembly, the apertures of the top plate and the cavities of the base retaining tray being substantially aligned in said loading and unloading position such as to define open plant pot receiving channels, the apertures of the top plate and the cavities of the base retaining tray being at least partially misaligned in said locked operative position such that a retaining portion of the inwardly-facing surface of the top plate obstructs part of the corresponding cavity in the base retaining tray, the at least one plant pot being retained within the base retaining tray and a part of the at least one plant protruding through the apertures of the top plate in said locked operative position; and the plant tray assembly being invertible to invert the at least one plant pot, the inverted at least one plant pot abutting the retaining portion of the inwardly-facing surface of the top plate and being retained within the plant pot receiving channels when the top plate and the base retaining tray are in the locked operative position.

2. The plant tray assembly of claim 1, wherein the top plate is displaceable within said plane by at least one of sliding, rotating and pivoting said top plate relative to the base retaining tray.

3. The plant tray assembly of claim 1, comprising an actuating device for displacing the top plate relative to the base retaining tray, said actuating device being an external actuating device detachably connected to said plant tray assembly comprising:

a first arm having a remote outer end thereof engageable to the top plate and an opposed inner end thereof pivotably mounted to an upstanding supporting bar having a rigid non-pivoting arm extending from a bottom end thereof, the non-pivoting arm having a remote base tray engaging element which is engageable to the base retaining tray, wherein the supporting bar is pivotable to be inclined relative to the plant tray assembly, the first arm being thereby horizontally displaced in a plane parallel to the top plate such as to translate the top plate between the loading and unloading position and the locked operative position.

4. The plant tray assembly of claim 3, wherein said top plate further comprises an aperture for receiving a ball element positioned on the remote outer end of the first arm, the first arm displacing the top plate between the loading and unloading position and the locked operative position through the ball element received in the aperture of said top plate.

5. The plant tray assembly of claim 1, wherein the base retaining tray comprises at least two upstanding support rails protruding therefrom which are substantially parallel to and spaced apart from the upper surface, the support rails supporting the top plate such that the top plate is displaceable along said rails for displacement between the loading and unloading position and the locked operative position.

6. The plant tray assembly of claim 5, wherein the top plate comprises at least one slot providing a passage for a retaining member extending from each of the support rails of the base retaining tray, the retaining member securing the top plate to the support rails of the base retaining tray while permitting relative displacement of the top plate and the base retaining tray, the retaining members sliding within the slot in the top plate and operable to lock the top plate in the locked operative position.

7. The plant tray assembly of claim 1, wherein the cavities of the base retaining tray have a first diameter that is smaller than a second diameter of the apertures of the top plate, the at least one plant pot adapted to be received in the plant tray assembly include top and bottom sections, the top section of the at least one plant pot defining an upper pot diameter that is greater than a bottom pot diameter of the bottom section of the at least one plant pot, and wherein the first diameter of the cavities of the base retaining tray is greater than the bottom pot diameter but smaller than the top pot diameter.

8. The plant tray assembly of claim 7, wherein the second diameter of the apertures of the top plate is greater than the top pot diameter.

9. The plant tray assembly of claim 7, wherein said top plate covers at least a portion of the top section of the at least one plant pot when said top plate is in said locked operative position.

10. The plant tray assembly of claim 1, wherein said base retaining tray further comprises an alignment aperture.

11. A plant tray assembly for holding at least one plant pot containing at least one plant and associated media, the plant tray assembly comprising:

a base retaining tray having a first surface and a second surface, and a plurality of cavities extending into the base retaining tray from openings in the first surface toward the second surface, the second surface being free of openings and forming a closed-end of the cavities for receiving the at least one plant pot; and a top plate mounted on the first surface of the base retaining tray and being displaceable relative to the base retaining tray in a plane substantially parallel to the first surface, the top plate having a plurality of apertures extend transversely therethrough;

the top plate and the base retaining tray being relatively displaceable between a loading and unloading position and a locked operative position of the plant tray assembly, the apertures of the top plate and the openings of the base retaining tray being substantially aligned in said loading and unloading position, the apertures of the top plate and the openings of the base retaining tray being at least partially misaligned in said locked operative position to trap the at least one plant pot within the cavities; and the plant tray assembly being invertible to invert the at least one plant pot, the inverted at least one plant pot abutting the top plate and being retained within the cavities when the top plate and the base retaining tray are in the locked operative position.

* * * * *